Sept. 8, 1931.     G. H. TABER     1,822,464
MOTOR VEHICLE
Filed Aug. 11, 1928     2 Sheets-Sheet 1

INVENTOR
George H. Taber
BY
his ATTORNEY

Sept. 8, 1931.         G. H. TABER         1,822,464
                        MOTOR VEHICLE
               Filed Aug. 11, 1928      2 Sheets-Sheet 2
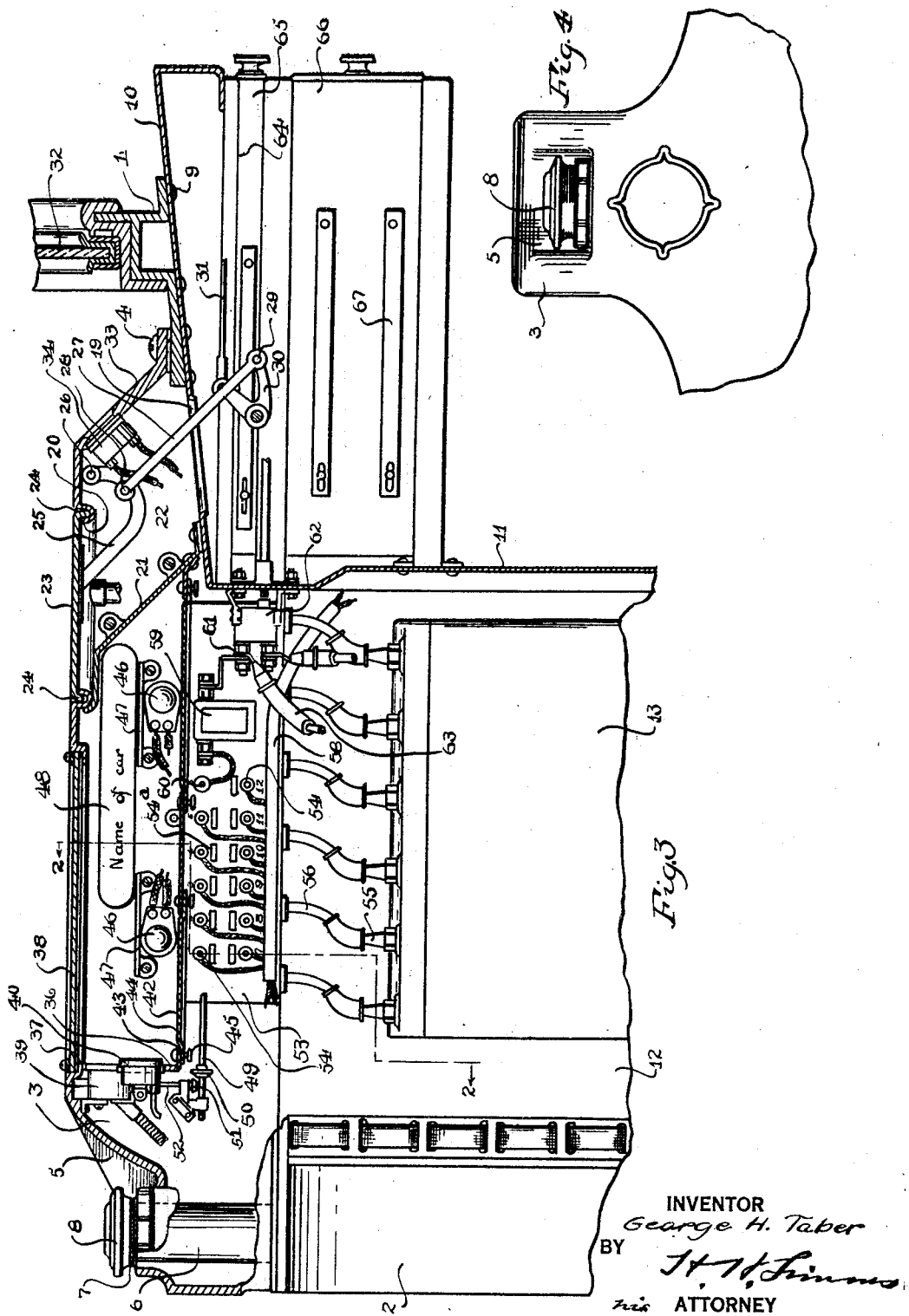
INVENTOR
*George H. Taber*
BY
*H. H. Simms*
his ATTORNEY Patented Sept. 8, 1931

1,822,464

UNITED STATES PATENT OFFICE

GEORGE H. TABER, OF BINGHAMTON, NEW YORK

MOTOR VEHICLE

Application filed August 11, 1928. Serial No. 299,050.

The present invention relates to motor vehicles and more particularly to the forepart of the same. An object of the invention is to provide a novel connecting member between the cowl of the vehicle and the radiator forming a firm support for instrumentalities used in connection with the vehicle. A further object of the invention is to provide a construction in which the indicating devices for indicating the speed, the temperature, the pressure of the oil and fuel and other similar devices are so arranged that the operator of the vehicle may have them under constant vision while driving the vehicle so that it is unnecessary to move the eyes from the road in order to view the indicating devices. Another object of the invention is to so locate all instruments and their connections that they are accessible for repairs or replacements without requiring one to enter the vehicle and reach under the cowl, while at the same time permitting the utilization of the space under the cowl for any desired useful purposes. Still another object of the invention is to so locate the circuit breaker that it may be connected directly to the heavy feed wire leading from the battery, thus making it possible to eliminate the danger of small wires overheating from short circuits. Still another and further object of the invention is to provide for the mounting on the opposite sides of the connecting member of signs which are effective both at night and during the day. Another and still further object of the invention is to provide a novel means of securely holding the hood sides in position while permitting the ready detachment of said sides in order to expose the interior of the hood. A still further object of the invention is to situate the terminals for all of the electrical appliances directly under the hood and to provide means for indicating such terminals so that the operator, even though he be a novice, may quickly locate any electrical troubles.

To these and other ends, the invention consists of certain parts and combinations of parts, all of which will be hereinafter described, the novel features being pointed out in the appended claims.

In the drawings:

Fig. 3 is a vertical section through the forward portion of the vehicle; and

Fig. 4 is a fragmentary view of the upper portion of the front end of the vehicle.

Figure 1:
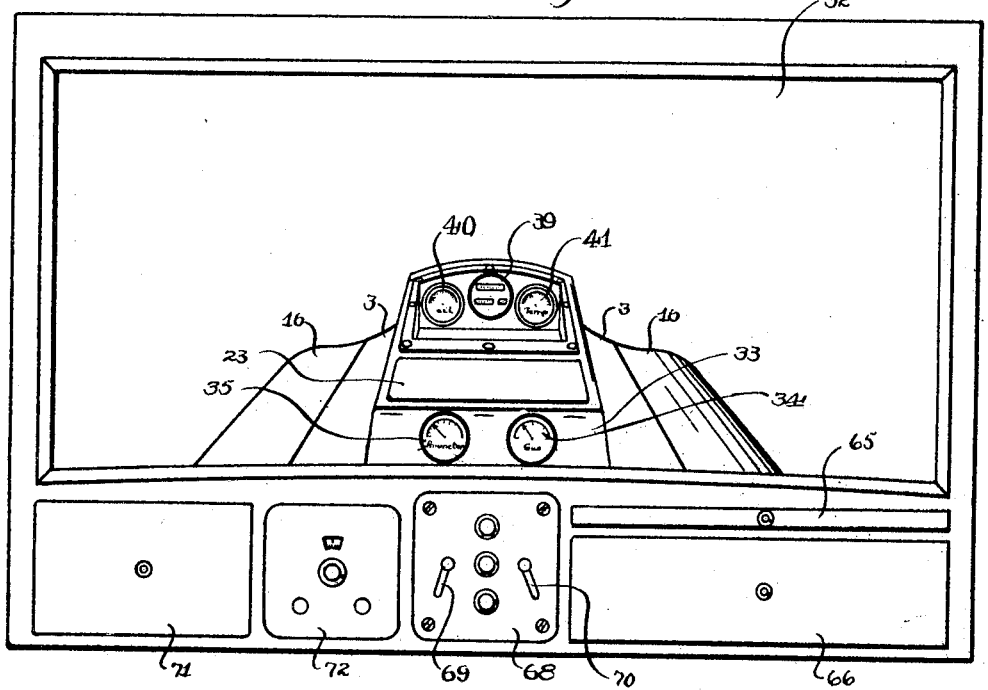
Fig. 1 is a perspective view from the inside of the vehicle looking through the windshield toward the front end of the vehicle.
Figure 2:
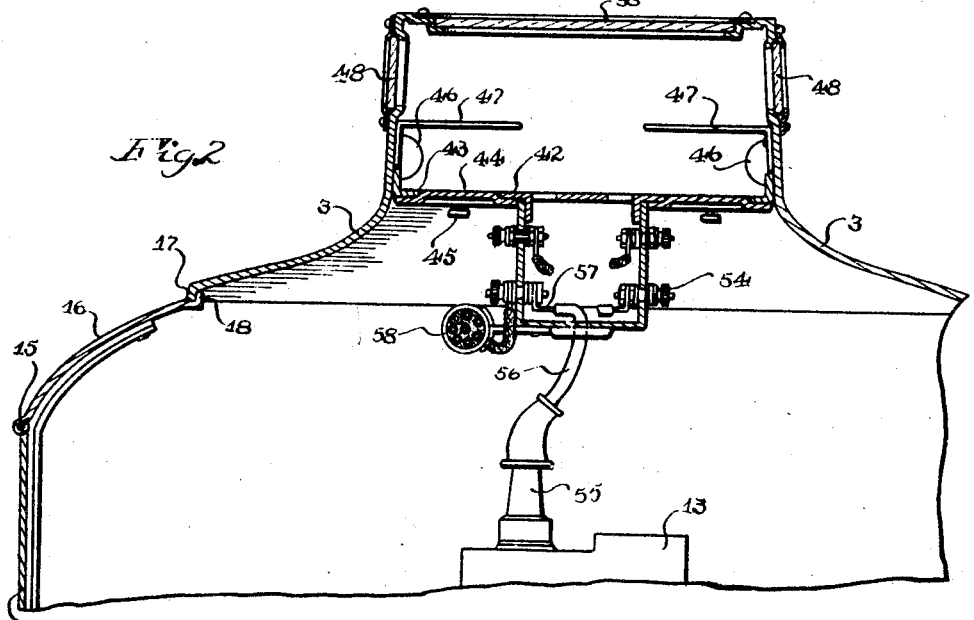
Fig. 2 is a vertical section on the line 2—2, Fig. 3.

Referring to the illustrated embodiment of the invention, 10 indicates the cowl and 2 the radiator. These two elements are rigidly connected at their tops by a connecting member 3 which may be termed a "monitor". This member is, in this instance, in the form of a chambered construction secured in its inner end to the windshield frame 1 by bolts 4, and having a central elongated portion extending longitudinally of the vehicle and projecting upwardly above the radiator and the lower portion of the windshield frame 1. At its forward end it has a depressed portion 5 in its top wall and in the depressed portion it is formed with an opening through which the filling tube 6 of the radiator extends, a nut 7 being fitted to the upper end of the filling tube 6 below the filling cap 8 and engaging external threads on the filling tube 6 while cooperating with the "monitor" about the opening through which the filling tube 6 passes. Secured to the windshield frame 1 by bolts 9 is the cowl 10 which has its forward end closed by a wall 11 separating the cowl from the hood chamber or compartment 12 in which the motor, in this instance, an internal combustion engine 13 is arranged, the chamber extending between the front wall 11 of the cowl and the rear wall of the radiator 2.

The two hood sides are formed, in this instance, each by two members, one, a lower member 14 hinged at 15 to the lower edge of the other or upper member 16. These sides rest at their side edges on the radiator 2 and the cowl 10 against the usual ribs formed thereon, the lower edge of the member 14 being secured to the vehicle body by any suitable fastenings. The upper edge of the member 16 of each hood side detachably connects with a side edge of the connecting member 3 and to this end, the connecting member 3 has on opposite side edges laterally turned or depending marginal ribs or flanges 17 behind which laterally turned upwardly extending marginal ribs or flanges 18 on the two members 16 are adapted to be hooked or engaged. When the parts are in normal positions, the member 16 of each hood side is held against displacement by the interlocking connections 17 and 18 between it and the connecting member 3, but each side member 16 may be swung upwardly to carry the flange 18 below the flange 17 to break the interlocking connection, thus permitting the hood side to be removed.

Ventilation of the cowl is obtained by providing an opening 19 in the top of the cowl in advance of the windshield frame 1 and beneath the connecting member 3. Above this opening 19, the connecting member 3 is provided with an opening 20 and a partition 21 is secured within the connecting member 3 to extend from the forward edge of the opening 20 to the forward edge of the opening 19 so as to provide a ventilating chamber 22 at the rear portion of the connecting member 3 leading to the cowl 10. A shutter 23 having a sealing fit 24 with the connecting member 3 is employed for closing the opening 20 in the connecting member. This shutter has a hinged arm 25 secured thereto away from the edge and pivoted at 26 within the ventilating chamber 22. To this hinged arm, a link 27 is pivoted at 28, said link also being pivoted at 29 to a bell crank lever 30 which through a controlling rod 31 leading into the interior of the car may be operated to control the position of the shutter 23.

Certain instruments, such for instance, the gas gauge, ammeter, oil gauge and the speedometer, have heretofore been supported on the dash board of the vehicle below the steering wheel. These instruments cannot be viewed without the operator moving his or her eyes from the road, this being especially dangerous when the vehicle is traveling at high speed. In this invention, these instruments are situated together with the temperature indicator of the radiator or engine so that all of them may be viewed through the windshield and without requiring the operator to remove his or her eyes from the road so that the operator may have complete vision both of the road and the general condition of the operating parts of the motor vehicle. The connecting member 3, in this instance, projects above the cowl 10 in advance of the windshield 32 so that its rear end 33 may be seen through the windshield thus presenting a wall on the member 3 at an angle to the line of vision and capable of being viewed without removing the eyes from the road ahead. Supported by this wall are two of the instruments which require constant attention, as for instance, the gas or fuel gauge or indicator 34 and the ammeter or battery indicator 35.

The connecting member 3 also has another wall 36 at an angle to the line of vision but viewable through the windshield, this wall or support being, in this instance, situated below the top wall of the connecting member 3 and so that it may be visible through the windshield 32, the top wall having an opening 37 in advance of the wall 36 closed, in this instance, by a plate of glass or other transparent material 38 and providing a line of vision between the windshield 32 and the support or wall 36 so that instruments on said wall are visible without the operator removing his or her eyes from the road ahead of the vehicle. In this instance, the wall 36 supports a speedometer 39, the oil gauge or indicator 40 and the temperature indicator 41 of the engine. With the end in view of closing this space between the wall or partition 21 and the wall or support 36, to prevent the collecting of dust, oil or dirt on the instruments, a horizontal partition 42 may extend between the wall or partition 36 and the wall or partition 21. Access to the chamber thus formed may be obtained through openings 43 in the partition 42 closed by plates 44 which are held in position by removable thumb bolts 45. For the purpose of illuminating instruments on the support 36, electric bulbs 46 may be secured within the chamber to opposite side walls thereof, and in order that direct rays will not pass from the chamber through the window in the top thereof, shade plates 47 are secured at opposite ends to the side walls of the chamber above the lamps 46.

This construction also makes possible the manufacture of automobiles to provide illuminated plates on the sides of the vehicle at the front thereof. This may be accomplished by providing opposite sides of the illuminated chamber with openings covered by name plates 48, made in this instance, of light transmitting material with the name of the car or other matter thereon in any suitable manner. The bulbs or lamps 46 illuminate these name plates at night but in the day time the letters are readily visible.

Remote control of the speedometer for trip mileage may be effected by a rod 49 extending from a point in the interior of the vehicle and having a gear 50 meshing with a beveled gear 51 on the shaft 52 which connects with the trip mileage register of the speedometer.

With the end in view of having all of the electrical connections readily accessible, and also so that they may be readily identified, a support is provided, comprising, in this instance, an elongated box-like structure 53 mounted by the connecting member 3 of the engine and having terminals or binding posts 54 for all the electric circuits of the vehicle secured to vertical walls thereof and suitably identified as by the names of the circuits as at 54ª. Leading from the spark plugs 55 through non-conducting coverings 56 are conductors 57 which connect with some of the binding posts on the inner side of the box, the conductors from the spark plugs passing through the bottom of the box. A loom 58 of the usual construction connects these binding posts with the distributor and battery in the usual manner. This terminal support also acts as a support for the circuit breaker 59 which connects at 60 to one of the binding posts and at 61 to the starter switch 62 which is supported by brackets from the partition or front wall of the cowl 10. A large terminal or battery wire 63 is closely connected to the circuit breaker so that in the event the insulation or wire is worn off, no short circuit in a small wire can occur as the current leading to the circuit breaker from the battery does not pass near nor through any other part. By having all the circuit terminals situated in proximity to each other upon a common support, an easy means is provided to locate short or open circuits, so that a novice can, in most instances, locate electrical troubles. This also keeps the mechanic out of the car body, thus preventing the soiling of the interior of the car.

Owing to the fact that all the instruments and their wires are removed from the panel board at the inside of the cowl, it is possible to employ this cowl for compartments or as a support for other devices. For instance, a slide pocket 64 may be employed in which a slide 65 is guided to act as a table for writing or other purposes. Below this slide may be arranged a sliding drawer 66. Both the drawer and the slide may have bow shaped springs 67 on opposite sides to cooperate with the sides of the compartments in which they operate in order to prevent rattling of the sliding elements. This panel board may also support the plate 68 on which the usual switches 69 and 70 are arranged. A drawer 71 may be arranged to slide at the opposite end of the panel board and a drawer 72 containing radio receiving instruments may also be mounted in the panel board. Both of said latter drawers have the bow springs 67 to prevent rattling of the drawers in the compartments.

From the foregoing it will be seen that there has been provided a motor vehicle in which those instruments which should be under constant vision of the operator of the machine are so situated that the operator may view the instruments without taking his or her eyes from the road ahead, thus preventing any accidents which occur from such procedure. This is accomplished by providing a connecting member between the cowl and the radiator which supports the different instruments in advance of the windshield and substantially in the line of vision employed in driving a car. In this instance, the speedometer is arranged adjacent the top of the radiator with the oil and temperature indicators positioned on opposite sides thereof. The ammeter and the gasoline gauge are arranged nearer the operator on this connecting member but in a position so that vision thereof is constant or continuous during driving. The speedometer and the temperature as well as the oil indicators are situated in a chamber which is closed by a transparent member to exclude dust and this chamber is illuminated so that the speedometer and indicators may be viewed at night. The illuminated chamber is also utilized for illuminating signs on opposite sides thereof, and these signs are also visible during the day. The rear end of the connecting member is so formed that it effectively displays through the windshield the indicators mounted thereon. A novel means is employed for securing a connecting member to the filling spout of the radiator. The hood sides are secured to the connecting member in a manner which permits their ready removal. The connecting member has a ventilating opening therein which communicates with the cowl of the vehicle. The circuit breaker is arranged between the battery and the different electrical circuits of the vehicle so that there is no chance of fire due to short circuits from the small wires. All of the circuits have their terminals arranged between the cowl and the radiator so that they are readily accessible without entering the vehicle, and at the same time are identified by means which renders it possible for a novice to locate electrical troubles.

What I claim as my invention and desire to secure by Letters Patent is:

1. In a motor vehicle, the combination with a cowl and a radiator, of a connecting member extending between the cowl and the radiator, and a speedometer mounted on said connecting member.

2. In a motor vehicle, the combination with a cowl and a radiator, of a connecting member extending between the same, and an indicating device mounted on said connecting member.

3. In a motor vehicle, the combination with a cowl and a radiator, of a connecting member extending between the two, and an indicating device supported by said connecting member at the forward part of the vehicle.

4. In combination with a motor vehicle, means providing a chamber at the top forward part of the vehicle having a transparent top wall through which vision of the interior chamber is obtained, an indicating instrument arranged in said chamber, and means for illuminating the face of said instrument.

5. In a motor vehicle, the combination with a cowl and a radiator, of a connecting member extending between the cowl and the radiator and having sides provided with light transmitting signs on opposite sides, and means for illuminating the inner faces of the signs.

6. In a motor vehicle, the combination with a cowl and a radiator, of a connecting member extending between said cowl and the radiator and having an elongated projecting portion extending outwardly above the cowl and the radiator, and hood sides connected to the connecting member below said upwardly projecting elongated portion.

7. In a motor vehicle, the combination with a cowl and a radiator, of a connecting member extending between the cowl and the radiator said connecting member being provided with a ventilating opening, means connecting said ventilating opening with the interior of the cowl.

8. In a motor vehicle, the combination with a cowl and a radiator, of a connecting member extending between the cowl and the radiator said connecting member being provided with a ventilating opening, means connecting said ventilating opening with the interior of the cowl, and a shutter for the ventilating opening controllable from the interior of the vehicle.

9. In combination with a motor vehicle, a speedometer arranged in advance of the windshield and viewable through the windshield, and means for controlling the trip mileage mechanism of the speedometer from the interior of the vehicle.

10. In a motor vehicle, the combination with a cowl and a radiator, of a chamber arranged on the vehicle between the cowl and the radiator and having an open top through which the forward edge of the chamber is viewable through the windshield, and an indicating device arranged at the forward end of said chamber.

11. In a motor vehicle, the combination with a cowl and a radiator, of a connecting member between the cowl and the radiator projecting above the cowl and having the rear end of its projecting portion viewable through the windshield of the vehicle, and an indicating device arranged on the rear wall of said projecting portion.

12. In a motor vehicle, the combination with a cowl and a radiator, of a connecting member extending between the cowl and the radiator, an ammeter, oil gauge and speedometer supported on said connecting member so that the interior of the cowl is left free for any desirable use.

13. In a motor vehicle, the combination with a cowl and a radiator, of a connecting member extending between the cowl and the radiator, a circuit breaker supported by said connecting member and having direct connection with the large feed wire of the battery.

14. In a motor vehicle, the combination with a cowl and a radiator, of a connecting member extending between said cowl and the radiator, rigidly secured to both, and having on its opposite sides downwardly turned flanges at the top of the radiator in spaced relation to the sides of the radiator, and hood sides each having a portion engaging the top of the radiator and provided with an upwardly turned flange along its edge detachably interlocking with the downwardly turned flange on the connecting member.

15. In a motor vehicle, the combination with a cowl and a radiator and a motor arranged between the cowl and the radiator and cooled by said radiator, of a connecting member extending between the cowl and the radiator over the motor carrying terminals for all the different circuits of the vehicle.

16. In a motor vehicle, the combination with a cowl and a radiator and a motor arranged between the cowl and the radiator and cooled by said radiator, of a connecting member extending between the cowl and the radiator above the motor and carrying terminals for all the different circuits of the vehicle, arranged between the cowl and the radiator, and a circuit breaker supported by said connecting member between the cowl and the radiator and interposed between the circuits and the main feed wire of the battery.

GEORGE H. TABER.